March 4, 1947.                D. SCIAKY                2,416,669
                CIRCUIT INTERRUPTING DEVICE WITH CONDENSER
                Filed Jan. 31, 1944              4 Sheets-Sheet 2
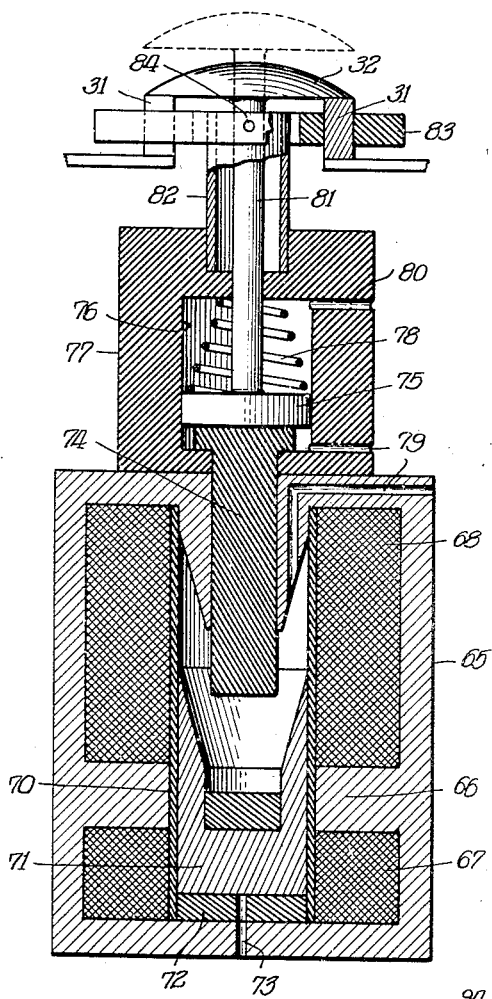
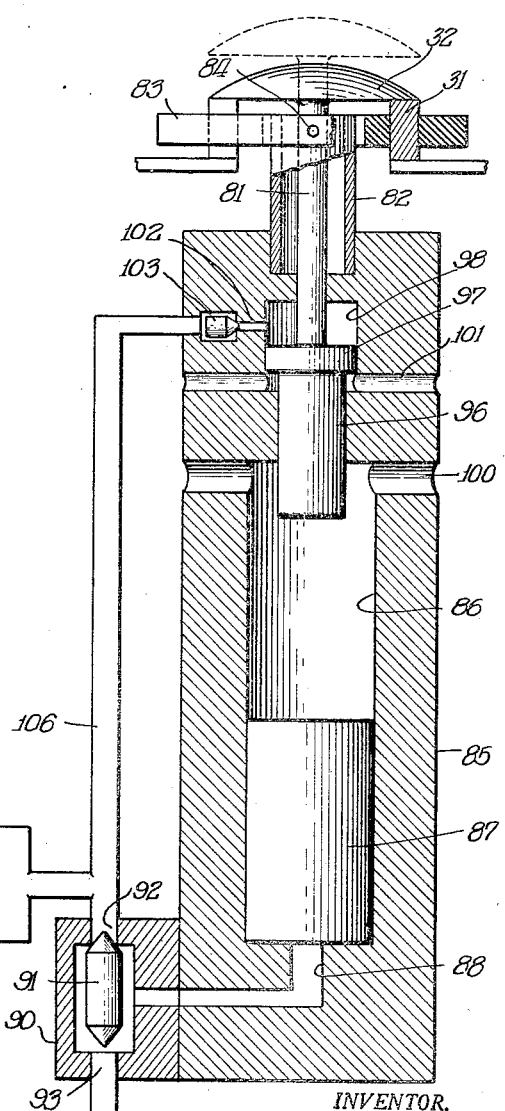
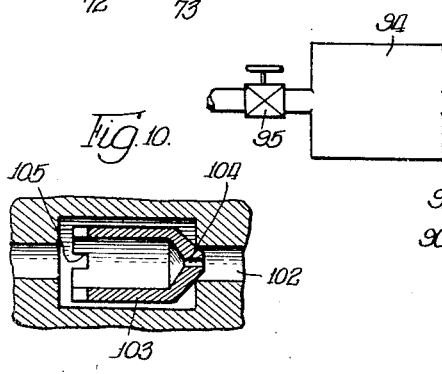
INVENTOR.
David Sciaky,
BY March 4, 1947.   D. SCIAKY   2,416,669
CIRCUIT INTERRUPTING DEVICE WITH CONDENSER
Filed Jan. 31, 1944   4 Sheets-Sheet 3
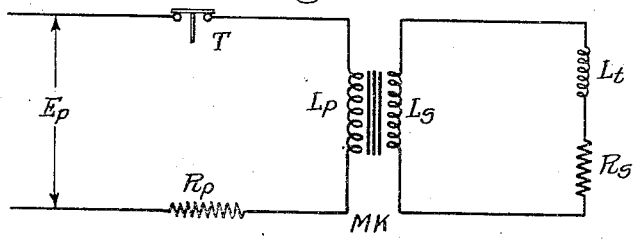
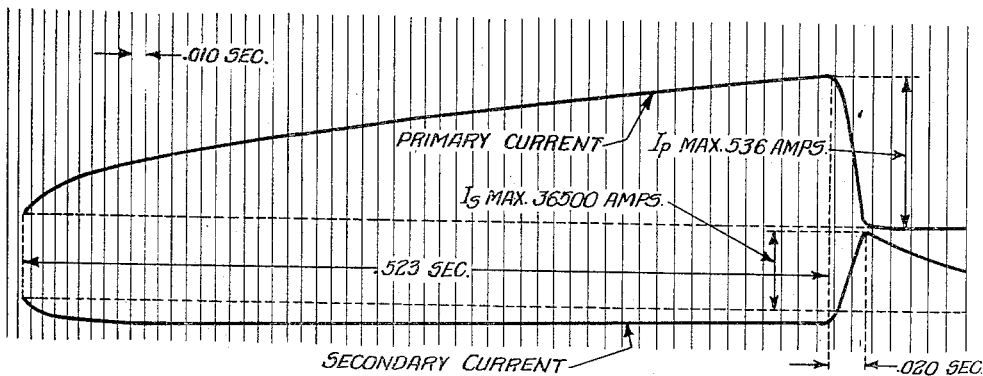
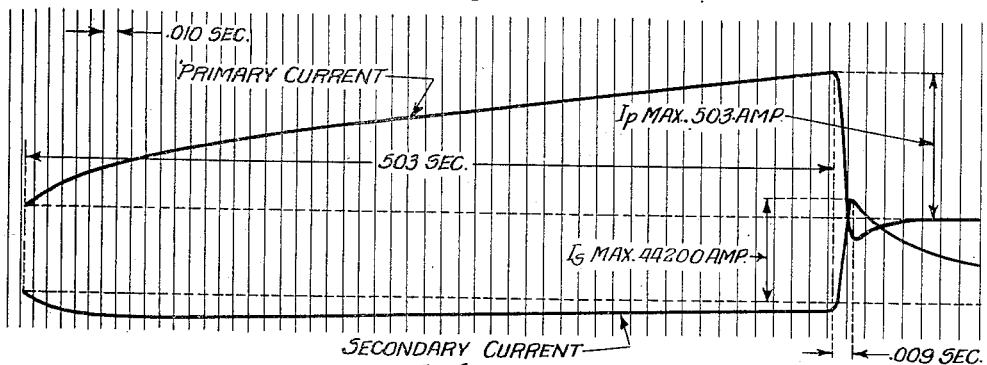
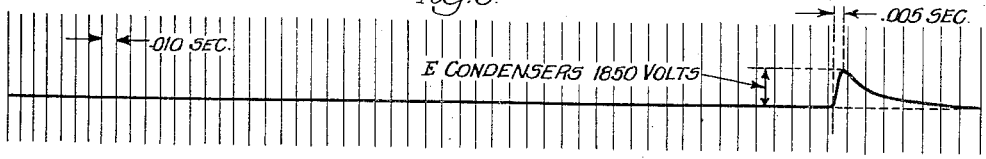
INVENTOR.
David Sciaky,
BY March 4, 1947.  D. SCIAKY  2,416,669
CIRCUIT INTERRUPTING DEVICE WITH CONDENSER
Filed Jan. 31, 1944  4 Sheets-Sheet 4
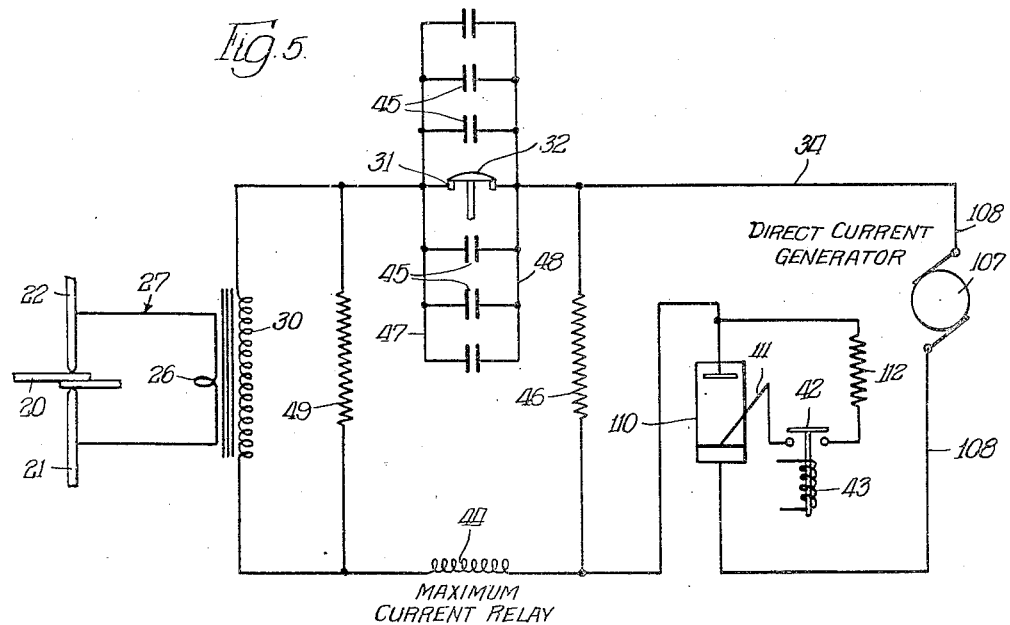
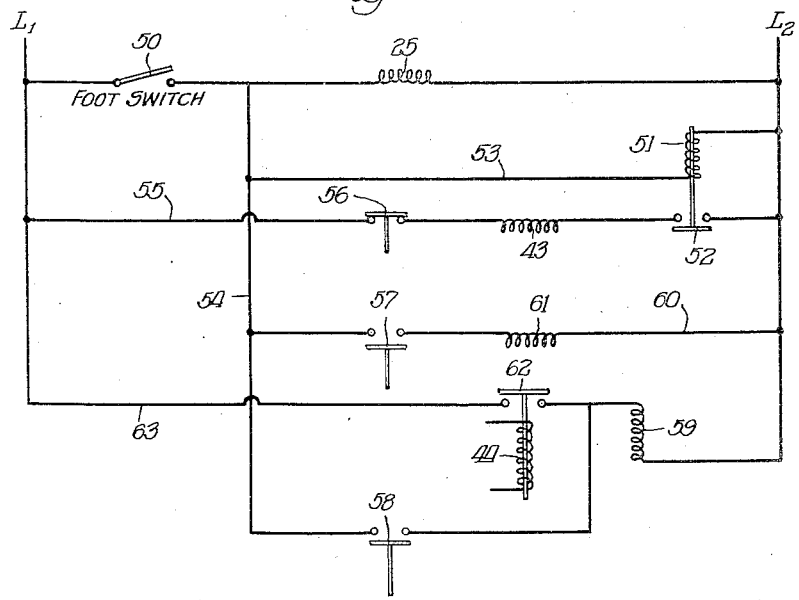
INVENTOR.
David Sciaky,
BY Patented Mar. 4, 1947

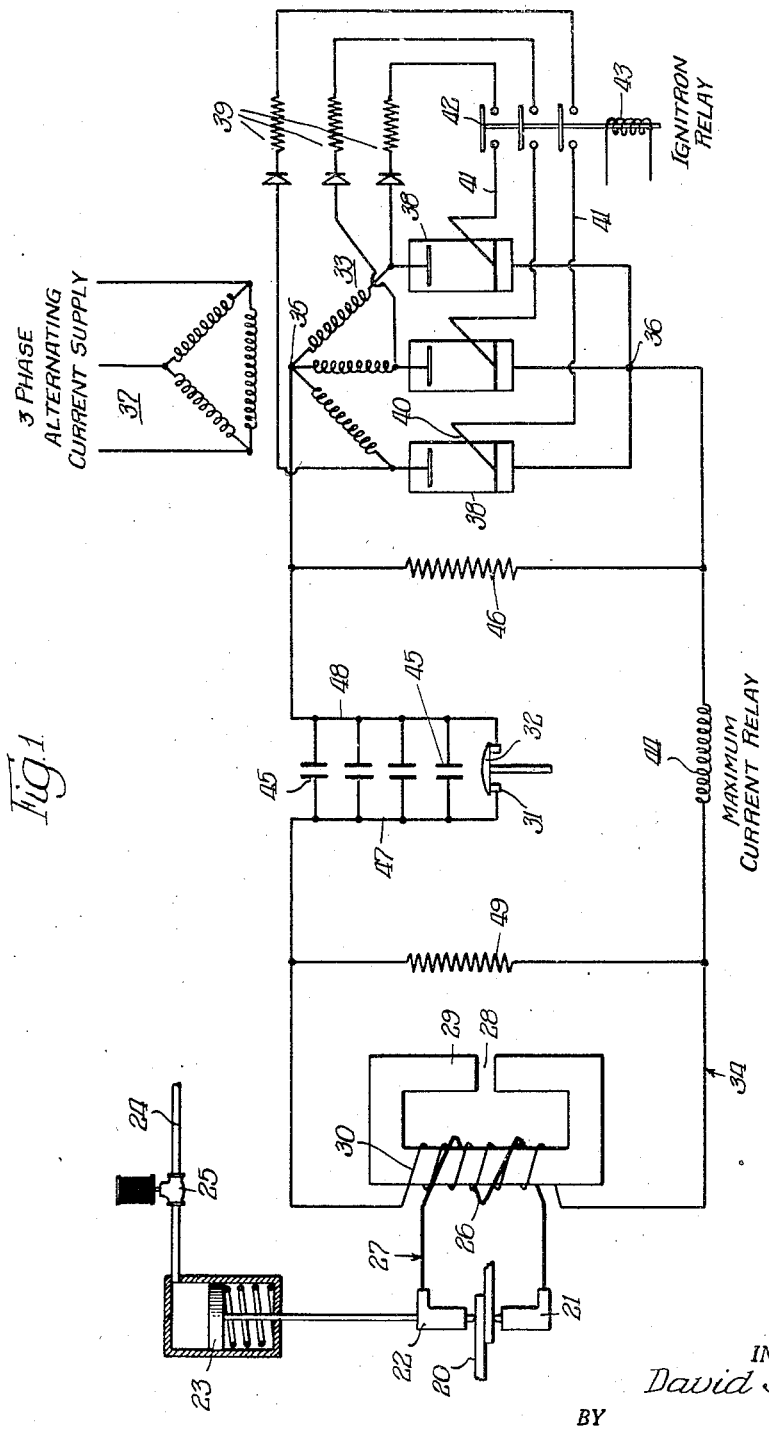

2,416,669

UNITED STATES PATENT OFFICE 2,416,669

CIRCUIT INTERRUPTING DEVICE WITH CONDENSERS

David Sciaky, Chicago, Ill., assignor to Welding Research, Inc., Chicago, Ill., a corporation of Illinois Application January 31, 1944, Serial No. 520,492

14 Claims. (Cl. 219—4)

The invention relates to circuit interrupting devices and has reference more particularly to a device for high speed, arcless interruption of the charging current in welding machines of the electromagnetic storage of energy type.

A high speed interruption of a direct current in a high power inductive circuit has always presented a difficult problem. One of the most outstanding examples of this problem concerns the difficulties encountered in designing electromagnetic stored energy resistance welding machines. The welding method applied in this type of machine is based on the principle of storing electromagnetic energy in a reactor having primary and secondary windings on an iron core, the magnetic circuit of which is interrupted by an air gap. A direct current voltage applied across the primary winding produces a charging current which increases exponentially. While the charging current is increasing it induces a voltage in the secondary winding or welding circuit which is proportional to the turn ratio and the rate of increase of the charging current. This produces a secondary current which flows through the metal workpiece at the electrodes and this serves to preheat the metal, preparing the same for the high peak welding current.

The charging current flowing through the primary winding is always interrupted before its steady state value is reached. This is accomplished by means of a mechanical interrupting device located in the primary circuit. At a predetermined maximum value of current the primary circuit is opened rapidly and the energy which has been stored in the reactor is dissipated in two ways, (1) most of it is transferred to the low impedance secondary circuit which produces a welding current reaching a high peak value, and (2) some of the energy is lost in the arc across the contact points of the interrupter.

It can be shown mathematically that the energy lost in the arc across the contact points of the interrupter is independent of the time of opening, or, stated in other words, is independent of the speed of interruption, although the voltage across the contact points is approximately inversely proportional to the time of interruption. It is also a fact that the inductance of the throat, which is necessarily of appreciable magnitude, acts in such a way as to lower the secondary peak value, thereby forcing more stored energy to be dissipated in the arc across the contacts of the interrupting device. From the foregoing, it may be stated that arc losses are inherent to the interruption of the primary current in the type of circuit as heretofore designed, and since said losses are independent of the speed of interruption, it can be assumed (1) that a highly accelerated speed of opening will not reduce the arc losses, and (2) that an inconsistent time of opening does not affect the secondary current peak, thereby not changing the performance of the welding machine, although there are certain limitations as regards this latter statement.

The present invention has for its object the provision of a high speed, arcless interrupting device having particular application to welding machines of the electromagnetic storage of energy type, and wherein the energy heretofore lost in the arc is stored by condensers so as to be subsequently transferred to the secondary winding for increasing the peak value of the welding current.

Another object of the invention is to provide for arcless interruption of the current flow in the primary circuit of an electromagnetic resistance welder by the provision of condensers in shunt relation with the fixed contacts of the interrupting device, and by further providing means whereby the capacitively stored energy may be transferred to the reactor and thus to the secondary circuit to supplement the welding current.

Another object of the invention resides in the provision of an interrupting device for high inductive circuits wherein the current flow in the circuit is interrupted by a fast breaking movable contact, and arcing is prevented by a bank of condensers connected in shunt relation to the fixed contacts of the interrupting device by a low inductive parallel circuit.

Another object is to provide circuit interrupting means such as a movable contact having condensers in shunt relation to avoid arcing at the contacts, and wherein means are provided to prevent the condenser discharge current from flowing back into the power lines with additional means in combination to flow the current instead through the primary winding of the reactor so that the capacitively stored energy can be transferred to the welding circuit.

Another object of the invention is to provide a circuit interrupting device employing a movable contact shunted by a bank of condensers connected in parallel and wherein the effect of the lead inductance is reduced to a minimum by passing the charging current along the terminals of the condensers and then through the interrupting device.

Another object is to provide an arcless interrupting device for a high inductive circuit having a new and improved movable contact for interrupting the current and wherein initial acceleration of the same will be high and its speed of stroke such that in any instance during the opening operation the contact points will be separated sufficiently to prevent ionization of the surrounding medium.

Another object is to provide a movable contact for interrupting the flow of current in an inductive circuit and which will be actuated by impact from a reciprocating plunger, the actuation taking place toward the end of the operative stroke of the plunger and after the same has gained considerable momentum whereby the contact is fast breaking, having high initial acceleration.

With these and other objects in view the invention may consist of certain novel features of construction and operation as will be more fully described and particularly pointed out in the specification, drawings and claims appended hereto.

In the drawings which illustrate an embodiment of the invention and wherein like reference characters are used to designate like parts—

Figure 1 is a diagrammatic view illustrating the electrical circuit of a welding machine of the electromagnetic storage of energy type and including in the primary circuit thereof arcless interrupting means coming within the invention;

Figure 2 is a vertical sectional view illustrating the construction of the electromagnetic type of mechanical interrupting device contemplated by the invention and having a movable contact actuated by impact;

Figure 3 is a vertical sectional view illustrating the construction of the pneumatic type of circuit interrupting device also employing a movable contact actuated by impact;

Figure 4 is a wiring diagram illustrating a simple coupled reactive circuit;

Figure 5 is a diagrammatic view similar to Figure 1 but illustrating in the primary circuit thereof a modified form of interrupting means coming within the invention;

Figure 6 is a wiring diagram showing in schematic form the manner of electrically connecting the various relays and contactors employed in the operation of the resistance welder disclosed in Figure 1;

Figure 7 is an oscillogram of primary and secondary currents of a standard size electromagnetic welder equipped with the arcing type of interrupting device as heretofore employed;

Figure 8 is an oscillogram of primary and secondary currents of a standard size electromagnetic welder equipped with the arcless interrupting device of the invention;

Figure 9 is an oscillogram illustrating the operation of the condensers employed in the arcless interrupting device of the invention; and Figure 10 is a fragmentary sectional view showing the restrictor employed in the pneumatic interrupting device of Figure 3.

Referring first of all to Figure 4, a simple coupled reactive circuit is shown including a primary circuit having inductance $L_p$, resistance $R_p$ and contactor T for interrupting the flow of current through the circuit resulting from the applied direct current voltage represented as $E_p$. The coupled secondary circuit includes the secondary inductance $L_s$ which is connected to a non-coupled external inductive circuit of resistance $R_s$ and inductance $L_t$.

The primary and secondary windings are coupled by means of the mutual inductance which may be indicated by $M=K\sqrt{L_p L_s}$, where K is the coupling factor. In the case of a welding machine $R_s$ and $L_t$ are the parameters of the throat of the machine, and $L_s$ represents the inductance of the secondary winding. Since a high turn ratio is used, the value of $L_s$ is much smaller than that of $L_p$, both windings enclosing the same magnetic circuit. Upon the application of a direct current voltage $E_p$ to the primary circuit the primary current will rise in a well known manner, being modified only by the effect of the secondary current. When the contactor is opened the energy which has been stored in the system is dissipated in two ways, (1) most of it is transferred into the low impedance secondary circuit, giving rise to a current reaching a high peak value, and (2) some of the energy is lost in the arc across the contact points.

To better understand the present invention a determination should first be made of the voltage and energy dissipated in the arc. At any time during the opening of the contactor, the voltage distribution in the primary circuit of Figure 4 is 1. $$-E_p - L_p \frac{di_p}{dt} + M\frac{di_s}{dt} + R_p i_p + e_A = 0$$

and in the secondary circuit the voltages are

2. $$-M\frac{di_p}{dt} + (L_s + L_t)\frac{di_s}{dt} + R_s i_s = 0$$

Equation 1 can be solved for the voltage $e_A$ across the contact points of the interrupting device by assuming a linear rise of the secondary current and by neglecting the voltage drops across the resistances since they are small compared to the inductive voltages. The approximations are valid provided the time of opening for the interrupting device is much less than the time constants of the circuit. By thus solving the equations it is found that 3. $$e_A = E_p + L_p \frac{di_p}{dt}\left[1 - \frac{K^2}{1+\frac{L_t}{L_s}}\right] \text{ volts}$$

which is the voltage across the contact points of the interrupting device, and

4. $$W_a = \frac{1}{2}E_p I_p t_c + \frac{1}{2}L_p I_p^2\left[1 - \frac{K^2}{1+\frac{L_t}{L_s}}\right] \text{ watts-seconds}$$

being the total energy loss in the arcing of the contacts, where $I_p$ is the value of the primary current at the instant of the opening and $t_c$ is the opening time.

In Equation 4 the first term represents the energy which is drawn from the power supply during the period of opening of the interrupting device. The second term is of greater interest since it corresponds to the energy transferred from the reactor and which constitutes about ninety-five per cent of the arc losses. According to the above equations the arc losses are independent of the time of opening of the interrupting device, whereas, the voltage across the contact points of the same is approximately inversely proportional to the time of opening. Both $e_A$ and $W_A$ are nearly proportional to the primary inductance and are materially affected by the ratio $L_t/L_s$ which is the ratio of the secondary throat inductance to the secondary core inductance, a value which is generally about .20, depending upon the size of the welding machine. In Equation 4 if we substitute .20 for said ratio and let K equal .98, it is found by neglecting the first term that $$W_A = \frac{1}{2}L_p I_p^2 \times 0.23$$

Also since the energy $W_L$ stored during charging is approximately equal to $$\frac{1}{2}L_p I_p^2$$

it is possible to solve as follows:

5. $\quad \dfrac{W_A}{W_L} = \dfrac{.23}{1} = .23$

Thus, in view of the foregoing, it may be stated that approximately twenty-three per cent of the stored energy in the reactor is lost in the arcing at the contacts of the interrupting device. It is also clear that the inductance of the throat, which is necessarily of appreciable magnitude, acts in such a way as to lower the secondary peak value, thereby forcing more stored energy to be dissipated in the arc of the interrupting device. From the above discussion it may be stated that arc losses are inherent to the interruption of the primary current in welding circuits as heretofore designed and from the fact that the arc losses are essentially independent of the time of opening it can be stated (1) that a highly accelerated opening for the interrupting device will not reduce the arc losses, and (2) that an inconsistent opening time does not affect the secondary current peak thereby not changing the performance of the welding machine although there are limitations as regards this latter statement.

Figure 1 illustrates diagrammatically the electrical circuits of a welding machine of the electromagnetic storage of energy type and which incorporates in the primary circuit an arcless interrupting device coming within the invention. Referring to said figure, the workpiece 20 to be welded is placed between the stationary electrode 21 and the movable electrode 22 of the welding machine. Pneumatic pressure is applied to the piston 23 from the air line 24 through operation of the solenoid valve 25, thereby causing the workpiece to be placed under mechanical pressure between the electrodes 21 and 22 which are electrically connected to the secondary winding 26. Said windings and the connections to the electrodes constitute the secondary circuit 27 of the welding transformer, having an air gap 28 in its iron core 29. The primary winding 30 is electrically connected through an interrupting device, comprising fixed contacts 31 and a movable contact 32, with a rectifier indicated in its entirety by numeral 33. One end of the primary circuit 34 is connected to the rectifier at a neutral point 35 and the other end of said primary circuit is connected to the rectifier as at 36. The source of power for the rectifier is indicated by numeral 37, the same comprising a conventional three-phase alternating current supply.

The rectifier 33 includes rectifying tubes 38 which may be of the ignitron type equipped with the usual firing rods 40 by means of which the ignitron tubes are fired to render them conducting. The firing rods 40 are connected by conductors 41 to the multi-contactor 42. The firing circuit is completed through current limiting resistors and rectifying elements 39 which are connected to the plates of the ignitrons. The relay 43 in turn controls the actuation of contactor 42 and thus by energizing said relay the contactor is caused to close and the ignitrons 38 are rendered operative to supply direct current to the primary circuit. When the current in the primary circuit reaches a preset maximum value the relay 43 is deenergized, the contactor opens, and the rectifier is rendered inoperative.

In accordance with the invention the stationary contacts 31 of the interrupting device are shunted by a plurality of condensers 45 connected in parallel by the leads 47 and 48. Between the bank of condensers and the rectifier a damping resistor 46 is provided and on the opposite side of said condensers, in parallel with the primary winding 30, a protecting resistor 49 is provided. The resistance of element 49 varies inversely as a definite exponent of the applied voltage, that is, at normal voltage such a resistor is an insulator, whereas, at high voltages it becomes a good conductor.

Reference is made to the wiring diagram of Figure 6 for an understanding of the operation of a welding machine provided with the improved arcless interrupting device as described in connection with Figure 1. The conductors of the electric circuit for operating the machine are indicated by $L_1$ and $L_2$. The foot switch 50 is connected across the conductors in series with the solenoid 25, which controls the valve in the air line 24. A timing delay relay 51, actuating the contactor 52, is connected in series with the foot switch by conductors 53 and 54. The contactor 52 is located in the circuit 55 which includes the normally closed contactor 56 and the igniting relay 43, Figure 1, for controlling operation of the rectifier. The circuit 60, which is connected in series with the foot switch 50 by the conductor 54, includes the coil 61 and the normally open contactor 57. The maximum current relay 44 in the primary circuit, see Figure 1, controls actuation of the contactor 62 in circuit 63 which includes the relay 59. Said relay is energized immediately upon closing of contactor 62. The conductor 54 is connected in series with the normally opened contactor 58 which is connected to circuit 63 in advance of said relay 59.

When the operator closes foot switch 50 the relay 25 is energized and pressure is applied to the workpiece, since the valve in air line 24 is opened to admit air to the cylinder to force the piston 23 in a downward direction. The timing delay relay 51 is also energized and after a short interval of time, to allow the secondary circuit to close through the workpiece, the contactor 52 will be actuated, closing circuit 55 and energizing the igniting relay 43. Energization of this relay effects closing of the multicontactor 42 to fire the ignitrons 38 and supply direct current to the primary circuit.

The primary current flowing through the winding 30 increases until a predetermined maximum is reached, determined by the maximum current relay 44. This maximum value of the charging current energizes the relay 44 to actuate the contactor 62 which closes, thereby connecting circuit 63 to the conductors $L_1$ and $L_2$ and energizing relay 59. Said relay functions to actuate in sequence the normally open contactors 58 and 57 and the normally closed contactor 56. It will be seen that closing of the normally open contactor 58 will lock relay 59 since said relay is thus connected to conductors $L_1$ and $L_2$ through circuit 54 and the foot switch 50. Relay 59, although energized upon closing of contactor 62, will thus remain energized as long as the operator maintains the foot switch 50 in closed position. Substantially simultaneously with the closing of the normally open contactor 58 the relay 59 will cause contactor 57 to also close. Closing of this contactor energizes coil 61 which functions in a manner to cause actuation of the movable contact 32 to interrupt the current flowing in the primary circuit. The movable contact 32 has a high initial acceleration as a result of the particular mode of operation of the interrupting device, Figures 2 and 3, to be more particularly described. Relay 59 also actuates the normally closed contactor 56 into open position which has the effect of deenergizing the relay 43, allowing the multicontactor 42 to open, thereby terminating operation of the rectifier 33.

When the direct current from the source of supply is caused to flow through the winding 30 it constitutes a charging current and energy is stored in the reactor. This current is terminated as described through the maximum current relay before a steady state value is reached. Actuation of the movable contact 32 terminates said current flow and during the very short time of opening of said contact the voltage across the condensers 45 rises to its maximum value and subsequently decays at a rate which is determined by the circuit parameters. A maximum value of the voltage across the condensers will be reached at the instant when the primary current has decayed to zero, at which moment the energy stored in the primary winding of the reactor is zero, and the energy stored in the condensers reaches its maximum value.

The action of the condensers has therefore been to absorb the electrical energy heretofore lost in the arc across the contact points of the interrupting device. In other words, as regards the arcless interrupting device of Figure 1, the energy stored in the reactor during the charging time is now distributed in two circuits. Most of it is transferred to the secondary circuit 27 where it establishes a high welding current, and the rest of it remains in the primary circuit 34 where it is stored in the condensers 45. Whereas, in the devices as heretofore constructed, the energy dissipated in the arc was lost to the system, the capacitively stored energy of the present invention is recovered and transferred to the reactor and thereby to the secondary circuit to supplement the welding current. The manner in which the stored energy is transferred to the secondary circuit will now be described.

When the condenser voltage reaches a maximum value, discharge immediately takes place and a current is caused to flow in the primary circuit in a direction which is reverse to the charging current. This reverse current flow is made possible by the damping resistor 46 connected across the terminals of the primary circuit in parallel with the rectifier. The damping resistor is necessary to complete the circuit so that this current may flow through the damping resistor, through the winding 30 and back to the condensers, it being understood that the ignitrons of the rectifier, which are now non-conducting, prevent such flow of this current. This flow of current in the primary circuit in an opposite direction therefore rises until it reaches a maximum negative value. From this time on said current flow will decay and the type of decay, either damped oscillating or exponential, can be controlled by the value of the damping resistor 46. When welding heavy gauges of light alloys it is desirable to obtain a slow exponential decay of welding current. Therefore the resistor 46 should have a value that the mode of current decay will be one of critical damping. If resistor 46 is smaller than this value the currents will oscillate and if larger the currents will fall rapidly to zero.

The capacity of the condensers is determined by both theoretical and practical considerations such as circuit parameters, maximum energy stored, permissible over-voltage and desired time for reaching the peak in the welding current. These conditions are determined by the maximum welding capacity for which the machine is built and by the nature of the metals to be welded.

As an added safety device a protecting resistor 49 is connected across the primary terminals of the reactor. This resistor varies inversely as a definite exponent of the applied voltage and thus the same protects the circuit elements from the dangerously high over-voltage which would occur if the primary circuit were opened while the electrodes were not in contact.

The inductance of the condenser circuit including the leads 47 and 48 should be low since otherwise it will tend to delay the flow of current into the condensers 45. It is comprised of the self and mutual inductances of said leads and of the internal inductance of the condensers. When impressing a direct current voltage across a pure capacitance, the current is generally assumed to reach its maximum value instantaneously and then to decay exponentially, that is, initially the capacitor acts as a zero impedance parameter. Since in any physical circuit there is always some inductance present, the condenser current will not rise instantaneously, but according to the time constant of the circuit. If the inductance of the leads is relatively high, arcing will occur across the contact points at the instant of their separation because the current rise in the condenser will be delayed. According to the invention, the effect of the lead inductance is reduced to a minimum by passing the charging current along the leads 47 and 48 of the condensers and then through the movable contact 32. By this arrangement, which is shown schematically in Figure 1, it is possible to avoid arcing.

A feature of the invention to also prevent arcing across the contact points resides in the mode of operation of the interrupting device whereby the movable contact has high initial acceleration. A very high voltage appears across the contact points at the beginning of the opening operation and thus the movement of the contact 32 must be high and its speed and stroke must be such that at any instant during the opening operation the contact points will have separated sufficiently to prevent ionization of the surrounding medium. This is accomplished by the structure shown in Figures 2 and 3.

Referring more particularly to Figure 2, a metal casing or housing 65 is provided having a metal separator 66 with a magnet coil 67 located within the housing below the separator and a larger magnet coil 68 positioned above the separator. An internal sleeve 70 of non-magnetic material extends from the top wall of the housing to the bottom wall. A metal piston 71 is adapted to have reciprocating movement within said sleeve and in inoperative position, as shown in Figure 2, the piston rests on a pad 72 of non-magnetic shock resisting material. A vent opening 73 forms an air release to permit piston 71 to assume said inoperative position.

The top wall of the housing suitably mounts an actuating plunger 74 formed of non-magnetic material, having its upper end in contact with the damping piston 75. Said piston is adapted to move within the bore 76 formed in part 77 of non-magnetic material, said bore also receiving the coil spring 78 which functions to return the piston to its lowermost position following actuation of the same. The numeral 79 indicates air release vents for the pistons 71 and 75, respectively, and 80 is a restricted air vent formed in part 77 above piston 75 which allows release of air in a controlled manner so as to partly cushion movement of piston 75 as it reaches its limit of travel in an upward direction.

Piston 75 is integral with a stem 81 which extends through the tube 82 and has the contact 32 fixed to its upper end. The plate 83 of insulating material is pivoted at 84 to the tube and said plate carries the fixed contacts 31 electrically connected to the conductors of the primary circuit, as shown in Figure 1. This pivotal mounting of the plate enables the contact 32 to seat properly and engage with equal pressure both of the fixed contacts 31.

In operation of this electro-magnetic form of interrupting device the coils 67 and 68 are energized at the same time and since the metal piston 71 will be in its down position, said coil 67 acts as a holding coil preventing travel of the piston upwardly, in which direction the piston is strongly urged by coil 68. When the primary current is to be interrupted the circuit to coil 67 is broken, the coil is thus deenergized and the coil 68 then attracts the piston 71. Said piston moves upwardly and attains considerable momentum when it engages the plunger 74. The impact on the plunger is such as to produce high initial acceleration and thus the contact 32 effects a fast breaking action with respect to the fixed contacts 31. Upward travel of piston 75 is cushioned by the restricted air vent 80 and the coil spring 78 returns the contact 32 and plunger 74 to initial position when coil 68 is deenergized at the completion of the welding operation. The coil spring also applies sufficient tension to maintain the contact 32 in proper engagement with the fixed contacts.

In the pneumatic form of interrupting device shown in Figure 3 the housing 85 of metal is provided with a vertical bore 86 within which is mounted a piston 87. An air inlet 88 is formed in the base of the housing and said inlet extends into part 90, having the valve 91 adapted to move into either of two positions. In the upper position, as shown, the valve 91 closes the air supply inlet 92. In its lower position the outlet 93 is closed and as a result the air under pressure from said supply is thus admitted to cause movement of the piston 87 in an upward direction. The numeral 94 indicates an air reservoir and 95 is a regulator. The plunger 96 is mounted for vertical movement in the top portion of the housing and piston 97, integral therewith, is located in the bore 98. A large air vent 100 allows free upward travel of piston 87 and a smaller air vent 101 provides for full downward travel of piston 97. The stem 81 is integral with piston 97 and said stem extends through the pipe 82, having the contact 32 fixed to its upper end, as described in connection with the device of Figure 2.

When the primary current is to be interrupted the coil 61, shown in the wiring diagram of Figure 6, is energized and the valve 91 is caused to move down to close outlet 93. Admission of high pressure air to the housing will produce upward movement of the piston 87 and the resulting impact with plunger 96 will actuate the contact 32 in the desired manner. The piston 97 is cushioned at the upper end of its stroke by the small vent 102 and the restrictor 103, best shown in Figure 10. Air is allowed to escape from bore 98 through the small opening 104 in the nose of the restrictor and through the slots 105 at the rear. A sufficient quantity of air is thus trapped in bore 98 above piston 97 to cushion its upward travel.

Air supply pipe 106 delivers air to the restrictor which is allowed to flow through the opening 104 into bore 98 and the pressure thus created functions to return piston 97 to initial position. The main piston 87 is returned by movement of valve 91 to its upper position whereby the air below piston 87 is exhausted through outlet 93. The piston 97 is held in down position by the air supplied to the bore 98 and this applies sufficient pressure to the contact 32 so that it seats properly on the contacts 31.

In the modification of Figure 5 the condensers 45 are arranged on opposite sides of the movable contact 32 having shunt relation with the fixed contacts 31. This form of the invention therefore differs in this respect from Figure 1, but in both arrangements the condenser circuit must have low inductance to facilitate charging of the condensers when the primary current is interrupted and so prevent arcing from taking place between the fixed contacts 31 and the movable contact 32.

In the present methods of arcless interruption of the charging current in a high inductive primary circuit the total change in primary current during the discharge period is equal to the sum of the charging current and of the negative peak of the reverse current flow. Therefore, for any given value of charging current, the induced secondary current, which welds the metal workpiece, will reach a higher peak when using condensers in accordance with the present invention than with the old methods heretofore in use. Figure 7 shows an oscillogram of the primary and secondary currents of a standard size electromagnetic welder wherein the primary current was interrupted by multi-pole contactors. For comparison Figure 8 shows an oscillogram of primary and secondary currents of a standard size electromagnetic welder wherein the arcless method of Figure 1 was employed in interrupting the primary current. Figure 9 shows the magnitude of the condenser voltage during the time of primary current interruption, its manner of rise and decay.

The primary current, as clearly shown in the oscillogram of Figure 8, changes continuously from its maximum charging value to its negative peak value, during which time it induces a voltage in the secondary circuit which is a function of the turn ratio of the windings and the rate of change of the primary current. This voltage is the driving electro-motive force of the secondary current which rises during the period of decay of the primary current and attains its maximum value at the instant that the primary current reaches its negative peak.

The primary circuits of Figures 1 and 5 may be supplied with direct current from any suitable source, the rectifier shown in Figure 1 having been selected for illustrative purposes only. However, the rectifier performs a necessary function in said combination in addition to supplying direct current, namely, that of preventing the condensers from discharging back into the power line. During the period of contactor opening a high voltage of opposed polarity to the rectified voltage appears across the condensers and it might force energy back into the supply system. Such a voltage surge would seriously disturb the power supply system and would also take energy away from the welding system, thereby lowering the peak welding current. Due to the rectifying properties of the tubes, current is prevented from flowing back into the supply line so that the above described condition can not take place. The rectifying tubes must be chosen so as to withstand this high voltage without back-firing. Other sources of direct current may be employed for the primary circuit when embodying the arcless interrupting method of the invention, provided a reverse current flow into the line is prevented by means of a high back voltage rectifying tube and a damping resistor such as 46 is connected across the terminals of the primary circuit to provide a path for said condenser discharge current so that the same may flow through the primary winding.

For example, reference is made to Figure 5 for a schematic showing of this feature of the invention. Direct current is supplied by a generator 107 which is connected by conductors 108 to the terminals of the primary circuit 34. Included in the primary circuit is the tube 110 which may be any rectifying tube having firing control such as the firing pin 111 connected through the resistance 112 to the anode terminal of the tube. The contactor 42, actuated to closed position by the relay 43, functions to render the tube conducting and thus permits a charging current to flow. Due to the properties of tube 110 the condenser discharge current can not pass into the power lines and therefore the condenser discharge current is shunted by damping resistor 46 and permitted to flow through the primary winding of the reactor. This results in transferring the capacitively stored energy to the welding load circuit.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a method of resistance welding in which energy is stored in an electromagnetic storage system having a primary winding, the steps which consist in connecting the primary winding to a source of direct current to cause a charging current to flow through said winding until a preset maximum is reached, rapidly interrupting the flow of said current to prevent ionization of the medium surrounding the contacts at the interruption, providing a parallel circuit of condenser capacity in shunt relation with said contacts to avoid arcing, reducing the inductance of the condenser circuit by locating the interrupting means beyond the condensers, whereby the charging current must flow past the terminals of the condensers and then through the interrupting means, preventing said condensers from discharging back into said source of direct current supply, and shunting said condenser discharge current through a resistance path connected across the terminals of the primary circuit so that said discharge current may flow through the primary winding.

2. In a method of resistance welding wherein energy is stored in a reactor transformer by flowing a charging current through the primary winding thereof, and wherein a welding load circuit is connected to the secondary winding, the steps which consist in rapidly interrupting the flow of said current to cause transfer of the stored energy to the welding load circuit, eliminating arcing at the contacts during interruption by a condenser circuit in shunt relation with the contacts whereby the energy which would be dissipated in said arcing is momentarily stored in the condensers instead, and in flowing the condenser discharge current through the primary winding in a direction reverse to the charging current to thereby transfer said capacitively stored energy to the welding load circuit and produce a single pulse of welding current.

3. In a method of resistance welding wherein energy is stored in a reactor transformer by flowing a charging current through the primary winding thereof, and wherein a welding load circuit is connected to the secondary winding, the steps which consist in interrupting the flow of said current to cause transfer of the stored energy to the welding load circuit to produce a peak welding current, said interruption of the flow of charging current taking place in such rapid manner as to prevent ionization of the medium surrounding the contacts at the interruption, eliminating arcing at the contacts during said interruption by connecting a low inductive condenser circuit in shunt relation with the contacts whereby the energy which would be dissipated in the arc is momentarily stored in the condensers instead, and in flowing the condenser discharge current through the primary winding in a direction reverse to the charging current to thereby transfer said capacitively stored energy to the welding load circuit to supplement said peak welding current.

4. In a resistance welder having a welding load circuit, in combination, magnetic energy storage means including a primary circuit, means supplying direct current to said circuit for storing energy in said storage means, means for interrupting the flow of current in said circuit, electrostatic energy storage means connected in shunt relation with said interrupting means, whereby upon interruption of said direct current the major portion of said stored energy is transferred to the welding load circuit and the remainder is stored in the electrostatic energy storage means, and a resistor connected across the terminals of the primary circuit to permit transfer of the electrostatically stored energy to said welding load circuit to produce a single pulse of welding current.

5. In a resistance welder having a welding load circuit, in combination, magnetic energy storage means including a primary circuit, means supplying direct current to said circuit for storing energy in said storage means, means for interrupting the flow of current in said circuit, comprising a movable contact having a high initial acceleration in an opening direction, electrostatic energy storage means comprising a condenser circuit of low inductance connected in shunt relation with said movable contact, whereby upon interruption of said direct current the major portion of said stored energy is transferred to the welding load circuit and the remainder is stored in said condensers, and a resistor connected across the terminals of the primary circuit to permit transfer of the electrostatically stored energy to said welding load circuit to produce a single pulse of welding current.

6. In a resistance welder, in combination, magnetic energy storage means including a primary circuit, means for supplying a direct current to said primary circuit, means for interrupting the flow of current in said circuit comprising a movable contact having a high initial acceleration in an opening direction, electrostatic energy storage means comprising a condenser circuit connected in shunt relation with the movable contact, and a damping resistor connected across the terminals of the primary circuit between said direct current supply and the said condenser circuit.

7. In a resistance welder, in combination, magnetic energy storage means including a primary circuit, a rectifier for supplying direct current to said primary circuit, means for interrupting the flow of current in said circuit comprising a movable contact having a high initial acceleration in an opening direction, and means for eliminating arcing at said contacts comprising electrostatic energy storage means connected in shunt relation with the movable contact, said electrostatic energy storage means comprising a parallel circuit of condenser capacity having a relatively low inductance, and a damping resistor connected across the terminals of the primary circuit between said rectifier and said condenser circuit whereby the condenser discharge current may flow in said primary circuit.

8. Apparatus for the electric resistance welding of metals, comprising a welding transformer having a primary and a secondary circuit, a rectifier for supplying direct current to the primary circuit of the said welding transformer, a movable contact in the primary circuit whereby a charging current may flow through said primary circuit when the contact is closed and which is interrupted by opening said contact, a condenser circuit including condensers in parallel connected in shunt relation with said movable contact, said movable contact having a high initial acceleration in an opening direction and said condenser circuit having relatively low inductance to thereby prevent arcing upon interruption of the charging current, and a damping resistor connected across the terminals of the rectifier between the same and said condenser circuit to permit the condenser discharge current to flow through the primary winding of the transformer.

9. Apparatus for the electric resistance welding of metals, comprising a welding transformer having a primary and a secondary circuit, a rectifier for supplying a magnetizing current to the primary circuit of the welding transformer to store energy therein by setting up a magnetic flux, a movable contact in the primary circuit for interrupting the magnetizing current, whereby collapse of the magnetic flux transfers said stored energy to the secondary circuit producing a welding current therein, a condenser circuit connected in shunt relation with said movable contact, said movable contact having a high initial acceleration in an opening direction and said condenser circuit having low inductance whereby arcing at the contacts is avoided and the energy which would be lost in the arc is stored in the condensers instead, and a damping resistor connected across the terminals of the primary circuit to permit the condenser discharge current to flow through the primary winding in a direction reverse to the magnetizing current, thereby continuing the collapse of the magnetic flux to supplement the welding current.

10. In a resistance welder having a welding load circuit, in combination, magnetic energy storage means including a primary circuit, means for supplying a direct current to said primary circuit to store energy in said storage means, a movable contact for interrupting the flow of current to said circuit to thereby transfer the stored energy to the welding load circuit, a condenser circuit connected in shunt relation with the movable contact to avoid arcing at the contacts upon interruption of the current whereby the energy which would be lost in said arcing is stored in the condensers instead, rectifying means in the primary circuit to prevent the condenser discharge current from flowing back to the direct current supply means, and a damping resistor connected across the terminals of the primary circuit between the condenser circuit and said rectifying means, whereby the condenser discharge current may flow in the primary circuit for transferring the capacitively stored energy to the welding load circuit.

11. Apparatus for the electric resistance welding of metals, comprising a welding transformer having a primary and a secondary circuit, a source of direct current, an electronic tube for connecting said direct current source to the primary circuit of said welding transformer, a movable contact in the primary circuit for interrupting the current flow by opening said contact, a condenser circuit including condensers in parallel connected in shunt relation with said movable contact, said movable contact having high initial acceleration in an opening direction and said condenser circuit having relatively low inductance to thus avoid arcing upon interruption of said current, said electronic tube preventing flow of the condenser discharge current back to the direct current source, and a damping resistor connected acros the terminals of the primary circuit between said condenser circuit and said electronic tube so that the condenser discharge current may flow through the primary winding of the transformer.

12. In combination, a source of direct current, an inductive load, a circuit electrically connecting the direct current source to said load for supplying direct current thereto, means for interrupting the flow of current to the load, electrostatic energy storage means connected in shunt relation with said interrupting means, whereby upon interruption of said direct current the portion of electromagnetic stored energy which would produce arcing across the interrupting means is stored in the electrostatic energy storage means, and a resistor connected across the terminals of said electric circuit to permit transfer of the electrostatically stored energy to said inductive load.

13. In combination, a source of direct current, an inductive load, a circuit electrically connecting the direct current source to said load for supplying direct current thereto, means in said circuit for interrupting the flow of direct current to said load including a movable contact whereby current may flow through said inductive load when the contact is closed and which is interrupted by opening said contact, a capacity circuit including condensers in parallel connected in shunt relation with said movable contact, said movable contact having a high initial acceleration in an opening direction and said capacity circuit having relatively low inductance to thereby prevent arcing upon interruption in the flow of said direct current, and a damping resistor connected across the terminals of said electric circuit between the direct current source and said capacity circuit to permit the condenser discharge current to flow through said inductive load.

14. In combination, a source of direct current, an inductive load, a circuit electrically connecting the direct current source to said load for supplying direct current thereto, means in said circuit for interrupting the flow of direct current to said load including a movable contact whereby current may flow through said inductive load when the contact is closed and which is interrupted by opening said contact, a capacity circuit including condensers in parallel connected in shunt relation with said movable contact to avoid arcing by the movable contact upon interruption of the current, whereby the energy which would be lost in said arcing is stored in the condensers instead, rectifying means in said electric circuit to prevent the condenser discharge current from flowing back to said direct current source, and a resistor connected across the terminals of said electric circuit between the said capacity circuit and the rectifying means, whereby the condenser discharge current may flow in said electric circuit and through said inductive load.

DAVID SCIAKY.

REFERENCES CITED

The following references are of record in the file of this patent:

UNITED STATES PATENTS

| Number | Name | Date |
|---|---|---|
| 883,059 | Starrett | Mar. 24, 1908 |
| 1,750,341 | Aichele | Mar. 11, 1930 |
| 2,196,820 | Verse | Apr. 9, 1940 |
| 2,276,851 | Livingston | Mar. 17, 1942 |
| 2,300,474 | Vedder | Nov. 3, 1942 |
| 2,331,242 | Smith | Oct. 5, 1943 |
| 1,357,257 | Slepian | Nov. 2, 1920 |
| 1,496,818 | May | June 10, 1924 |
| 1,821,813 | Nickle | Sept. 1, 1931 |
| 1,821,814 | Nickle | Sept. 1, 1931 |